United States Patent [19]

House et al.

[11] Patent Number: 4,597,878

[45] Date of Patent: Jul. 1, 1986

[54] POLYPHENOLIC ACID ADDUCTS

[75] Inventors: Roy F. House, Houston, Tex.; Victor M. Granquist, Lafayette, La.

[73] Assignee: Venture Innovations, Inc., Lafayette, La.

[21] Appl. No.: 688,077

[22] Filed: Dec. 31, 1984

[51] Int. Cl.$^4$ ............................................. C09K 7/06
[52] U.S. Cl. ........................... 252/8.5 M; 252/8.5 P; 252/8.55 R
[58] Field of Search ............ 252/8.5 M, 8.5 P, 8.55 R

[56] References Cited

U.S. PATENT DOCUMENTS

| | | | |
|---|---|---|---|
| 3,168,475 | 2/1965 | Jordan et al. | 252/8.5 |
| 3,494,865 | 2/1970 | Andrews et al. | 252/8.5 |
| 3,775,447 | 11/1973 | Andrews et al. | 252/8.55 X |
| 4,421,655 | 12/1983 | Cowan | 252/8.5 |

FOREIGN PATENT DOCUMENTS

| | | | |
|---|---|---|---|
| 0049484 | 4/1982 | European Pat. Off. | 252/8.5 |
| 3400164 | 7/1984 | Fed. Rep. of Germany | 252/8.5 |
| 2135321 | 8/1984 | United Kingdom | 252/8.5 |

*Primary Examiner*—Herbert B. Guynn
*Attorney, Agent, or Firm*—Roy F. House

[57] ABSTRACT

The invention provides novel humic acid derivatives obtained by reacting humic acid-containing materials with a noval amide mixture comprising a polyamide and an amido-amine containing one free amino group per molecule. The novel amide mixture is obtained by reacting under amidation conditions a fatty acid containing 16 to 30 carbon atoms with an amine mixture comprising aminoethylethanolamine (AEEA) and one or more polyethylenepolyamines (PEPA) containing 3 or more amino groups per molecule, wherein the weight ratio of AEEA/PEPA is in the range from about 0.25/1 to about 3/1, and wherein the amount of fatty acid is less than the amount required to amidate all of the amino groups and greater than the amount required to amidate all but one amino group per molecule.

14 Claims, No Drawings

POLYPHENOLIC ACID ADDUCTS

FIELD OF THE INVENTION

The invention relates to organophilic humic acid derivatives which are particularly useful as fluid loss additives in drilling fluids having an oleaginous continuous phase.

PRIOR ART

In the drilling of wells for oil and gas by the rotary method, it is common to use a circulating fluid which is pumped down to the bottom of the well through a drill pipe, where the fluid emerges through ports in the drilling bit. The fluid rises to the surface in the annular space between the drill pipe and the walls of the hole, and at the surface it is treated to remove cuttings and the like to prepare it for recirculation into the drill pipe. The circulation is substantially continuous while the drill pipe is rotated.

An important feature of oil base well working fluids of the class described is their ability to resist filtration. In most instances when they are in actual use, whether as drilling fluids, packer fluids, fracturing or completion fluids, the well working fluid is in contact with a more or less permeable formation, such as, for example, sandstone, sandy shale and the like, with an effective balance of pressure such that the fluid tends to be forced into the permeable formation. When a well working fluid is deficient in its ability to resist filtration, then the solids in the fluid are held back by the permeable formation and build up as a filter cake or sludge on its surfaces, while the liquid per se of the well working fluid filters into the permeable formation. The filter cake or sludge thus formed is generally very undesirable. Moreover, the loss of oil to the formation is very expensive, not only because of the cost of the oil itself, but also due to the cost of maintaining the properties and composition of the fluid.

Various additives have been used or suggested for use as fluid loss additives to prevent or decrease this loss of fluid by filtration from oil base muds. Some of the first materials used for this purpose were asphalt and various modified asphaltic materials. The following U.S. patents all disclose various amine derivatives of various polyphenolic compounds for use as fluid loss additives (hereinafter sometimes referred to as FLA) for oil base muds: Jordan et al. U.S. Pat. Nos. 3,168,475; Jordan et al. 3,281,458; Beasley et al. 3,379,650; Cowan et al. 3,232,870; Cowan et al. 3,425,953; Andrews et al. 3,494,865; Andrews et al. 3,671,427; Andrews et al. 3,775,447; Kim 3,538,071; Kim 3,671,428; and Cowan 4,421,655.

Jordan et al. U.S. Pat. Nos. 3,168,475 and 3,281,458 disclose certain substituted ammonium salts of humic acid. Compounds useful in the practice of their invention can be represented by the formula $[R_1R_2R_3R_4N]^+Hu^-$: wherein at least one of the R's is an alkyl radical having from 12 to 22 carbon atoms in a straight chain, and in which those R's which do not have from 12 to 22 carbon atoms in a straight chain are chosen from the group consisting of hydrogen, alkyl radicals having fewer than 12 carbon atoms, phenyl, and benzyl; wherein $Hu^-$ is the anion of humic acid; wherein the term "alkyl" includes unsaturated alkyl chains, such as, for example, oleyl as well as stearyl; and wherein at least one of the alkyl radicals having from 12 to 22 carbon atoms may be attached to the nitrogen atom indirectly through an intermediate linkage, most generally a heterocylic carbon-nitrogen ring.

Beasley et al. U.S. Pat. No. 3,379,650 discloses various additives (dispersants) which facilitate the dispersion of long chain alkyl ammonium humates in organic liquids. Such humates are more readily dispersible in some organic liquids than in others. The dispersibility of these humates is also dependent to some extent on their processing during manufacture. Thus drying these long chain alkyl ammonium humates decrease their dispersibility.

Andrews et al. U.S. Pat. No. 3,494,865 discloses an adduct prepared by reacting humic acid with from about 50% to about 110% of its base-combining capacity, with certain fatty acid partial amides of a polyalkylene polyamine having from 3 to 7 amino groups. The amide is only partial such that from about one-third to about two-thirds of the nitrogen atoms are present in the form of a fatty acid amide, the balance being in the form of free amino groups. As stated therein at column 3, lines 10–12. "The adduct as described and wherein the partial amide is present to the extent of about 110% of the base-combining capacity of the humic acid probably represents salt formation for 100%, the remaining 10% being absorption, although in view of the complicated nature of the constituents, exact structural analysis is difficult and somewhat uncertain. Also, depending on the drying temperature, where heat is used for such a step, the adduct may undergo a certain extent of amidification where the amine groups of the polyamines are combined with the carboxyl groups of the humic acid." Andrews et al. discuss the dispersion of such adducts in well working fluids and further discloses certain dispersants which are desirable to expedite the dispersion of the adducts without depending on down-hole circulation of the well working fluids.

Andrews et al. U.S. Pat. No. 3,671,427 discloses certain adducts of humic acid and a fatty acyl partial amide of a polyalkylene polyamine having from 3 to 7 amino groups wherein the partial amide is linked to the humic acid by an amide linkage. The amide is only partial such that from one to all but one of the nitrogen atoms are present the form of a fatty acid amide, the balance being in the form of free amino groups.

Cowan U.S. Pat. No. 4,421,655 discloses certain organophilic derivatives of various polyphenolic acids as fluid loss additives for oil base well working fluids. The derivatives comprise complex salts of a polyphenolic acid, an amino compound, and a polyvalent metal compound. The amino compound includes partial amides of polyalkylenepolyamines containing at least two primary, secondary, or tertiary amino groups per molecule.

Beasley et al. U.S. Pat. No. 3,325,537 discloses certain salts for solublizing lignite in water to achieve a solublization of at least 65% by weight and at the same time obtain a resulting pH within the limits of 5.2 to 7.5. Such lignite solutions are disclosed to be useful in preparing long chain alkyl ammonium humates.

Generally speaking, the substituted ammonium humates disclosed in these prior art patents may be produced by bringing together humic acid and the substituted ammonium compound in its base form. The base and the acid neutralize each other with salt formation to produce the desired humate derivative. Another general method of preparation disclosed is to convert the humic acid to a simple salt by reaction with an alkali, so as to produce sodium humate, potassium humate, ammonium humate, and the like, by reaction with alkali metal or ammonium bases, respectively. The substituted ammonium compound is caused to be present in the form of a simple salt or in quaternary ammonium form. Thus the free amine groups may be reacted with a simple acid such as hydrochloric, acetic, and the like to give the corresponding substituted ammonium chloride or acetate, respectively. This method of procedure is stated to have the advantage that the substituted ammonium salts and quaternary ammonium salts, and the simple humates as described are both water soluble, so that solutions of each reactant may be made, and the reaction completed by mixing solutions thereof together. Mixtures of water with methanol, ethanol, isopropanol, acetone, and the like may be needed for some substituted ammonium salts and quaternary ammonium salts.

While various of these additives have found utility as fluid loss additives in oil-base muds, their solubility or dispersibility is such as to require the presence of a dispersant in the additive composition or oil base mud. See for example the cited Beasley et al. U.S. Pat. Nos. 3,379,650 and Andrews et al. 3,494,865.

Because of increasing concern over the environmental problems associated with the use of oil base muds in which diesel oil, crude oil, or like oleaginous liquids are used as the continuous phase, oil base drilling fluids based on non-toxic mineral oils are increasing in popularity. These mineral oils, being more highly refined and generally containing a low content of aromatic compounds, have less solvency for the organophilic polyphenolic fluid loss additives of the prior art. Thus the solubility or dispersibility of these additives in mineral oils is less than in diesel oil, etc., and generally a dispersant or enhanced concentration of dispersant is necessary to adequately prepare oil base drilling fluids based on non-toxic mineral oils.

SUMMARY OF THE INVENTION

We have now found certain organophilic derivatives of humic acid, or modifications thereof, that possess good dispersibility in mineral oils. The organophilic derivatives comprise an adduct of a polyphenolic acid selected from the group consisting of humic acid, sulfonated humic acid, oxidized humic acid, and mixtures thereof, and an amide mixture of a polyamide containing no free amino groups and an amido-amine containing one free amino group per molecule, wherein the weight ratio of the amide mixture to the polyphenolic acid is in the range from about 0.2 to 1 to about 1 to 1.

Accordingly, it is an object of this invention to provide an improved organophilic polyphenolic fluid loss additive for use in oil base fluids, particularly highly refined, low aromaticity, mineral oil base fluids.

It is another object of this invention to provide a method of preparing a composition comprising a mixture of polyamide containing no free amine groups and an amido-amine containing one free amino group per molecule, which composition is especially adapted for modifying polyphenolic acids to prepare organophilic derivatives thereof.

It is yet another object of this invention to provide a composition comprising a mixture of a polyamide containing no free amino groups and an amido-amine containing one free amino group per molecule, which composition is especially adapted for modifying polyphenolic acids to prepare organophilic derivatives thereof.

It is still another object of this invention to provide, in a process for drilling a well wherein there is circulated in the well an oil-base fluid subject to filtration into permeable formations penetrated by the well, a method of maintaining the filtration at a selected low value during the drilling.

These and other objects of this invention will be apparent to one skilled in the art upon reading this specification and the appended claims.

While the invention is susceptible of various modifications and alternative forms, specific embodiments thereof will hereinafter be described in detail and shown by way of example. It should be understood, however, that it is not intended to limit the invention to the particular forms disclosed, but, on the contrary, the invention is to cover all modifications and alternatives falling within the spirit and scope of the invention as expressed in the appended claims.

The compositions can comprise, consist essentially of, or consist of the stated materials. The method can comprise, consist essentially of, or consist of the stated steps with the stated materials.

PREFERRED EMBODIMENTS OF THE INVENTION

The amide mixture of my invention which is useful for modifying polyphenolic acids to prepare organophilic derivatives thereof comprises a mixture of a polyamide containing no free amino groups and an amido-amine (sometimes referred to as a partial amide) containing one free amino group per molecule. The mixture is obtained by reacting under amidification conditions, such as heating at a temperature in the range from about 140° C. to about 225° C. for a period of time sufficient to remove one mole of water for each mole of acid, an acid containing from about 16 to about 30 carbon atoms per molecule and a polyamine mixture comprising aminoethylethanolamine and one or more polyethylenepolyamines containing at least 3 amino groups per molecule, wherein the amount of acid is greater than the amount required to amidate (X-1) amino groups per amine molecule, where X is the average number of amino groups per molecule in the amines, and less than the amount required to amidate all of the amino groups. By using such an amount of acid there is obtained a mixture of a total amide of the polyamines and an amido-amine containing one free amino group per molecule.

Preferably the amine mixture has a weight ratio of the aminoethylethanolamine to polyethylenepolyamines within the range from about 0.25 to 1 (0.25:1) to about 3 to 1 (3:1), most preferably from about 0.75 to 1 to about 3 to 1.

Preferably the weight ratio of the acid to the amine mixture is greater than (0.745)(TAV)(M) to 1 and less than (TAV)(M) to 1 where TAV is the number of milliequivalents of amino groups per gram of the amine mixture and M is the number of grams per milliequivalent of the acid (i.e., the milliequivalent weight).

The amide mixture is conveniently prepared by reacting the acid and the mixture of amines at a temperature in the range from about 140° C. to about 225° C., preferably from about 160° C. to about 210° C., for a period of time sufficient to remove one mole of water per mole of acid. The reaction may be conducted at atmospheric pressure or under vacuum. Generally the time-temperature requirements are reduced as the pressure is decreased. At atmospheric pressure the amidification reaction commences at about 140° C. and the temperature slowly rises thereafter. The reaction is complete after heating for one hour at 205°±5° C.

The acids which are preferred for use in this invention are aliphatic carboxylic fatty acids containing from 16 to 30 carbon atoms per molecule. The term aliphatic is to be understood as including unsaturated as well as saturated (alkyl) straight carbon chain radicals, and straight carbon chain radicals which contain one or more hydroxyl groups substituted therein. Rosin (abietyl) acids may also be used in practicing this invention, particularly in admixture with the aliphatic carboxylic fatty acids. Such mixtures are present in tall oil fatty acid, the concentration of rosin acids increasing with decreasing purity of the tall oil fatty acid. Most preferably the aliphatic carboxylic fatty acid contains from about 16 to about 22 carbon atoms.

The polyamines which are useful in this invention comprise aminoethylethanolamine and one or more polyethylenepolyamines having the empirical formula $H_2N(C_2H_4NH)_zH$ where z is greater than or equal to 2, and the condensed derivatives of such linear polyethylenepolyamines containing piperazine rings. Such polyethylenepolyamines are well known and commercially available, such as diethylenetriamine, triethylenetetramine, tetraethylenepentamine, aminoethylpiperazine, and higher homologs thereof containing up to 7 to 9 or more amino groups per molecule. It is to be understood that the term amino (or amine) group herein is intended to mean primary ($NH_{2-}$), secondary (-NH-), and tertiary

amino groups. Various characteristics of these amines are given in Table A.

The amount of acid required to react with and amidate the amino groups of the amine mixture must be less than the amount necessary to amidate all of the amino groups and greater than the amount necessary to amidate all but one amino group per molecule. This concentration of acid will produce a mixture of a polyamide (a totally amidated polyamine) and an amido-amine containing one free amino group per molecule. However, if one or more of the polyethylenepolyamines contains a tertiary amino group, such as a piperazine ring, then the amount of acid may be greater than the amount required to amidate all of the amino groups since the tertiary amino groups will not form an amide, and thus the amide mixture will always contain an amido-amine as one of the components thereof.

The number of milliequivalents of acid required to amidate all of the amino groups, and all but one of the amino groups, per gram of amine for aminoethylethanolamine and various polyethylenepolyamines are given in Table A. This type of data can be used to calculate the amount of acid required to amidate all of the amino groups, and all but one of the groups, for the amine mixtures as indicated in Table B.

There are commercially available mixtures of polyethylenepolyamines for which the exact molecular composition is not known. The data in Table B indicate that regardless of the molecular composition of the polyethylenepolyamine mixture, when the weight ratio of aminoethylethanolamine to polyethylenepolyamines is at least about 0.75 to 1, then when the weight ratio of the acid to the amine mixture is greater than (0.745)(TAV)(M) to 1 and less than (TAV)(M), where TAV is the number of milliequivalents of amino groups per gram of amine mixture and M is the number of grams per milliequivalent of the acid, there will always be obtained an amide mixture comprising a polyamide and an amido-amine.

TABLE A

| | Chemical Characteristics of Polyamines | | | |
|---|---|---|---|---|
| Polyamine | Number Of Amino Groups Per Molecule | Total Amine Value meq./g. | * | ** |
| Aminoethylethanolamine | 2 | 19.2 | 9.6 | 0.50 |
| Diethylenetriamine | 3 | 29.1 | 19.4 | 0.67 |
| Triethylenetetramine | 4 | 27.4 | 20.55 | 0.75 |
| Tetraethylenepentamine | 5 | 26.45 | 21.2 | 0.80 |
| Pentaethylenehexamine | 6 | 25.9 | 21.6 | 0.83 |
| Hexaethyleneheptamine | 7 | 25.45 | 21.8 | 0.86 |
| Octaethylenenonamine | 9 | 24.9 | 22.1 | 0.89 |
| Aminoethylpiperazine | 3 | 23.2 | 15.5 | 0.67 |

*Meq. of acid per g. of amine required to amidate all but one amino group
** * ÷ Total Amine Value

TABLE B

| | Chemical Characteristics of Polyamine Mixtures | | | |
|---|---|---|---|---|
| Polyethylenepolyamine (PEPA) | AEEA to PEPA Weight Ratio | Total Amine Value meq./g. | * | ** |
| Diethylenetriamine | 0.75 | 24.85 | 15.2 | 0.611 |
| Triethylenetetramine | 0.75 | 23.9 | 15.85 | 0.664 |
| Tetraethylenepentamine | 0.75 | 23.35 | 16.2 | 0.695 |
| Pentaethylenehexamine | 0.75 | 23.0 | 16.45 | 0.715 |
| Hexaethyleneheptamine | 0.75 | 22.75 | 16.55 | 0.728 |
| Octaethylenenonamine | 0.75 | 22.45 | 16.75 | 0.745 |
| Diethylenetriamine | 1.0 | 24.15 | 14.5 | 0.600 |
| Triethylenetetramine | 1.0 | 23.3 | 15.1 | 0.648 |
| Tetraethylenepentamine | 1.0 | 22.8 | 15.4 | 0.675 |
| Pentaethylenehexamine | 1.0 | 22.55 | 15.6 | 0.691 |
| Hexaethyleneheptamine | 1.0 | 22.3 | 15.7 | 0.700 |
| Octaethylenenonamine | 1.0 | 22.05 | 15.85 | 0.718 |
| Diethylenetriamine | 1.67 | 22.9 | 13.3 | 0.580 |
| Triethylenetetramine | 1.67 | 22.3 | 13.7 | 0.615 |
| Tetraethylenepentamine | 1.67 | 21.9 | 13.9 | 0.636 |
| Pentaethylenehexamine | 1.67 | 21.7 | 14.1 | 0.649 |
| Hexaethyleneheptamine | 1.67 | 21.55 | 14.2 | 0.658 |

*Meq. of acid per g. of amine mixture required to amidate all but one amino group per molecule.
** * ÷ Total Amine Value The preferred polyphenolic acids which are useful in the practice of this invention are selected from the group consisting of humic acid, sulfonated humic acid, and mixtures thereof.

Humic acid is a material of wide distribution and is present in soils, peat, and coals, particularly lignite or brown coal, and most particularly in the soft brown coal known as leonardite. Humic acids are complex organic molecules that are formed by the breakdown of organic matter. Their exact structures are unknown, and they are extremely variable. The principal organic groups present are phenolic and carboxylic OH, aliphatic CH, carbonyl, conjugated carbonyl or aromatic $CH_2$ or $CH_3$ or ionic carboxyl, and possibly others. The average molecular weight of the humic acids is between 5,000 and 50,000. They have no x-ray or electron diffraction patterns and are therefore presumably amorphous.

The humic acids have a large cation exchange capacity which varies from 200 to 500 milliequivalents per 100 grams at pH7 depending on the humus source. Humic acids are colloids. When the cation exchange sites on the humic molecule are filled predominantly with other than hydrogen, the material is called humate. The humates of monovalent inorganic and ammonium ions are soluble in water, but the humates of multivalent cations are insoluble.

The term humic acid is used herein to include all of the colloidal acids derived from humus, including humic acid, ulmic acid and fulvic acid. Humic acid is soluble in alkali but insoluble in acid, methyl ethyl ketone, and methyl alcohol. Ulmic acid is soluble in alkali and methyl ethyl ketone but insoluble in methyl alcohol. Fulvic acid is soluble in alkali, methyl ethyl ketone and methyl alcohol. The term humic acid is also intended to mean humic acids which have been further oxidized to increase their carboxyl content. See for example, "Chemistry of Brown Coals. IV. Action of Oxygen in Presence of Alkali", R. A. Durie and S. Sternhill, Australian Journal of Applied Science, 9, No. 4, 360–369, 1958; and U.S. Pat. No. 2,813,826, incorporated herein by reference.

While humic acid is present in soils and peat, and may be extracted from them, for example, with dilute aqueous alkali or sulfite salts (see for example, Schwartz U.S. Pat. No. 3,398,186, incorporated herein by reference), it is preferred to obtain humic acid for the purposes of this invention in the form of lignite of high alkali solubility, of which vast deposits are found throughout the world, including particularly, the United States, for example, in North Dakota, Montana, Texas, New Mexico, and California. While I do not mean to be limited thereby, I prefer a humic acid source having a solubility in aqueous sodium hydroxide of at least 65% by dry weight, preferably at least 75%, as this provides a reasonable compromise between cost and efficacy in the final product.

Humic acid-like polyphenolic acids such as oxidized coals are also intended to be encompased by the term "humic acid" as used herein. See for example, U.S. Pat. No. 4,235,728, incorporated herein by reference.

Other preferred polyphenolic acids useful in the practice of this invention are sulfonated humic acids, which term is intended to include sulfonated lignite, sulfonated oxidized coals, sulfomethylated humic acid, sulfomethylated lignite, and sulfomethylated oxidized coals. See for example, the following U.S. Patents, incorporated herein by reference: U.S. Pat. Nos. 3,034,982; 3,039,958; 3,352,902; 3,700,728.

Other polyphenolic acids derived from tannins and lignins, such as lignosulfonic acid, carboxylated lignin, oxidized lignin, quebracho, sulfonated quebracho, carboxylated quebracho, oxidized quebracho, and the like may also be rendered organophilic by reaction with the amide mixture of our invention.

Throughout this specification and claims, when weight ratios or percentages based on the weight of the polyphenolic acid are given, it is intended to mean that such weight ratios or percentages are based on the dry material which is the source of the polyphenolic acid, such as lignite, oxidized coals, and the like, when the polyphenolic acid is not extracted from its source material. In this manner, a determination of the precise concentration of the polyphenolic acid in its source material need not be made.

The polyphenolic acid adducts of my invention can be prepared by bringing together the polyphenolic acid and amide mixture. In this manner, the free amino group in the amido-amine reacts with the carboxylic acid or sulfonic acid groups in the polyphenolic acid with salt formation, and the polyamide in the amide mixture is sorbed onto the salt so formed. In this step there should be present at least 20% water, based on the weight of the polyphenolic acid, preferably at least 30% water, in order to insure that the acid and base (free amino group) can react. Generally, intensive mixing is sufficient for reaction. The temperature and time of reaction are not critical and need only be sufficient to insure that the polyphenolic acid and the amide mixture react to form an ammonium salt of the amido-amine and the polyphenolic acid. Generally, the polyphenolic acid may be at ambient temperature and the amide mixture may be at a temperature sufficient to provide the amide mixture in a liquid state, either alone or in combination with a suitable solvent such as water, methanol, isopropanol, and the like. This method can be employed in any conventional high intensity mixer which is capable of handling solid or semi-solid materials, such as a pug mill, ribbon blender, Littleford Bros. Mixer, Martin Mixer, and the like apparatus.

Alternatively, and preferably, the polyphenolic acid is converted to its simple salt form with a solublizing base, such as alkali metal or ammonium hydroxide, alkali metal borate, alkali metal sulfite, and the like. This method is advantageously employed where the amide mixture is mixed with a suitable acid to form a salt of the free amino group in the amido-amine of the amide mixture, for example, with hydrochloric acid, acetic acid, sulfuric acid, or phosporic acid, preferably acetic acid. In this process the amount of water can be increased to provide a solution or dispersion of the polyphenolic acid salt. In such a case the derivative should be filtered or otherwise treated mechanically to remove water before the derivative is dried and ground. This method is particularly advantageous where larger quantities of the amide mixture are desired in the derivative, such as amounts greater than about 40% by weight, based on the weight of the moisture-free polyphenolic acid or water soluble salt thereof. This method can also be employed in the process previously described which utilizes low concentrations of water where the alkali necessary to convert the polyphenolic acid to its simple salt form, such as sodium hydroxide, may be included in the intensive mixer with the polyphenolic acid before addition of the acid-amide mixture thereto.

The polyphenolic acid derivative of our invention can be prepared by the process disclosed in the copending patent application of one of the present inventors, Ser. No. 574,379 filed Jan. 27, 1984, now U.S. Pat. No. 4,569,799 incorporated herein by reference.

The amount of the amide mixture adducted with the polyphenolic acid compound will be from about 20% to about 100% by weight based on the weight of moisture-free polyphenolic acid, preferably from about 30% to about 75%, i.e., a weight ratio of amide mixture to polyphenolic acid in the range from about 0.2 to 1 to about 1 to 1, preferably from about 0.3 to 1 to about 0.75 to 1.

When the weight ratio of amide mixture to polyphenolic acid is in the range from about 0.2 to 1 to about 0.75 to 1, there may be additionally reacted with the polyphenolic acid an alkyl ammonium compound of the type disclosed in Claim 6 of Jordan et al. U.S. Pat. No. 3,168,478, incorporated herein by reference, or a partial amide of the type disclosed in Claim 4 of Andrews et al. U.S. Patent No. 3,775,447, incorporated herein by reference, in an amount within the range from about 5% to about 35% by weight based on the weight of moisture-free polyphenolic acid.

Subsequent to the reaction of the polyphenolic acid and the amide mixture, there is advantageously added to the polyphenolic acid derivative from about 2% to about 10%, preferably from about 3.5% to about 7.5%, based on the weight of moisture-free polyphenolic acid, of a polyvalent cation-containing compound, preferably lime, which is sufficiently soluble in water to react with the derivative to form a salt therewith, as disclosed in Cowan U.S. Pat. No. 4,421,655, incorporated herein by reference.

Preferably the polyphenolic acid derivative is dried to a moisture content in the range from about 5% to about 15% by weight, and ground to produce a free-flowing powder. The particle size of the powder will preferably be such that at least 95% by weight will pass through a 100 mesh screen. The drying temperature may be relatively low, such as 60°–120° C., for example, or it may be at a higher temperature, such as, for example, about 300° C.

The combination of the polyphenolic acid and the amide mixture produces an organophilic polyphenolic acid derivative which is useful as an additive to an oil base drilling fluid to maintain the filtration rate of the drilling fluid at a selected low value while drilling a well with the drilling fluid. The polyphenolic acid derivative is easily solublized or dispersed in oil base well-working fluids with the normal agitation available where such fluids are prepared, such as at "liquid mud" plants or at the location where the well-working fluid is used. Heating and agitation of the well-working fluid such as circulating it through the drill bit at the bottom of the borehole being drilled may enhance the rate of dispersion of the polyphenolic acid derivative in the fluid.

The polyphenolic acid derivative is of particular use in oil base well-working fluids in which a low aromaticity mineral oil is the continuous phase, such as mineral oils containing less than about 30% by volume aromatic hydrocarbons, preferably less than about 20%, and most preferably less than about 10% by volume of aromatic hydrocarbons. As mentioned previously, such oil base drilling fluids are advantageously employed in environmentally sensitive areas where the desired qualities of an oil base drilling fluid are desired.

Frequently, the well working fluids will contain other additives, a common one being water, often present from as little as 2% by volume to as great as 40% to 60% by volume. It is desirable and common to use a suitable emulsifying agent, which may be the calcium salt of a fatty acid, e.g. calcium tallate, to emulsify the water in the oil. Often water soluble salts such as calcium chloride are added to the aqueous phase of the well-working fluid. Weighting materials are routinely used in well-working fluids where needed, such as ground barite, calcium carbonate, siderite, hematite, itabirite, ilmenite and the like. Suspending agents and viscosifiers such as organophilic clays, asphalt and the like are commonly employed.

Dispersants for organophilic polyphenolic compounds such as those disclosed by Beasley et al. U.S. Pat. Nos. 3,379,650 and Cowan et al. 3,425,953 may be added but generally they are not necessary since the polyphenolic acid derivatives of our invention are readily soluble or dispersible in well working fluids.

The invention will now be described in further detail by means of exemplary demonstrations thereof. In the examples all parts are by weight. In the polyphenolic acid adducts, all weight ratios and percentages are based on the weight of the moisture-free polyphenolic acid-containing material unless otherwise indicated. All amide mixtures were prepared at atmospheric pressure by heating the acid to 80° C., adding the polyamine mixture, heating the mixture to 205±5° C., and maintaining that temperature for one hour.

EXAMPLE 1

A polyamine mixture having a total amine value (TAV) by perchloroacetic acid titration of 16.0 milliequivalents per gram was analyzed by gas chromatography to contain 2.9% diethylenetriamine, 8.3% aminoethylpiperazine, 50.5% aminoethylethanolamine, 1.0% monoethanolamine, 8.2% hydroxyethylpiperazine, and 27.3% residue which contains higher polyethylenepolyamines. The concentration of higher polyethylenepolyamines in the amine mixture, calculated by subtracting the amine values for the known amine components from the TAV is about 6.8%–7.5%, viz: $(100)(16.0-(0.029)(29.1)-(0.083)(23.2)-(0.505)(19.2)-(0.005)(16.3)-(0.082)(19.2)) \div$ (amine value of the polyethylenepolyamine). Assuming the polyethylenepolyamines in the residue are either triethylenetetramine (amine value=27.4) or octaethylenenonamine (amine value=24.9), then the concentration of higher polyethylenepolyamines in the residue is in the range from about 6.8% to about 7.5%. Thus the weight ratio of aminoethylethanolamine to polyethylenepolyamines in the amine mixture is in the range from about 2.7 to about 2.8, i.e., $50.5 \div (2.9+8.3+7.5)$ to about $50.5 \div (2.9+8.3+6.8)$.

The polyamine mixture (PM) was amidated with tall oil fatty acid (TOFA) containing about 5% rosin acids having a milliequivalent weight of 0.29 grams per milliequivalent using various ratios of acid to the polyamine mixture as indicated in Table 1.

TABLE 1

| | Composition of Amide Mixtures | | |
|---|---|---|---|
| A<br>Amide<br>Mixture | B<br>Grams of<br>TOFA per<br>Gram of PM | C<br>Milliequivalents<br>of TOFA per<br>Gram of PM | D<br>Column C<br>÷ TAV<br>of PM |
| 1a | 2.18 | 7.53 | 0.47 |
| 1b | 2.91 | 10.03 | 0.63 |
| 1c | 3.64 | 12.54 | 0.78 |
| 1d | 4.36 | 15.05 | 0.94 |
| 1e | 5.09 | 17.55 | 1.10 |

These amide mixtures were used to prepare adducts with humic acid as follows:

(1) 42.0 grams of sodium tetraborate pentahydrate were added to 1100 grams of hot water;

(2) Heat to 75° C.–88° C.;

(3) 75.0 grams, dry basis, of Texas lignite and 75.0 grams, dry basis, of North Dakota Leonardite were then added and mixed ten minutes;

(4) 125 grams of the amide mixture were then added and mixed five minutes;

(5) A solution containing 20% by weight sulfuric acid was then added to decrease the pH to 2.5, and the mixture reacted five minutes;

(6) Lime was then added to increase the pH to 6.25 to 6.5;

(7) The mixture was then filtered and the filter cake dried at 150° F. to 5–8% moisture;

(8) The dried organophilic lignite sample was ground.

No sample was prepared from Amide Mixture 1e (Table 1) as the mixture resulting from step 7 could not be ground as it was too "sticky".

The samples were evaluated by mixing 11.1 grams of sample with 350 milliliters of diesel oil and MENTOR 28 mineral oil in a Waring Blendor for five minutes. These dispersions were then evaluated for fluid loss by the API RP 13B procedure. The results are given in Table 1A.

TABLE 1A

Evaluation of the Organophilic Lignite Samples Prepared from the Amide Mixtures

| Amide Mixture Used to Prepare Humic Acid Derivative | API Fluid Loss, ml. | |
|---|---|---|
| | MENTOR 28 | Diesel Oil |
| 1a | 60 | 63 |
| 1b | 11 | 13 |
| 1c | 5 | 7 |
| 1d | 2 | 3.5 |

The data indicate that samples 1b–1d, examples of the adducts of this invention, efficiently decreased the fluid loss of these oils. Sample 1a, which was prepared from an amide mixture which is not a component of this invention, did not effectively reduce the fluid loss of these oils.

EXAMPLE 2

A polyamine mixture having a total amine value (TAV) by perchloroacetic acid titration of 15.75 milliequivalents per gram was analyzed by gas chromatography to contain 2.0% diethylenetriamine, 6.9% aminoethylpiperazine, 46.8% aminoethylethanolamine, 1.1% lightends, 0.6% ethylene glycol, 0.3% monoethanolamine, 2.2% hydroxyethylpiperazine, and 40.1% residue which contains higher polyethylenepolyamines. The concentration of higher polyethylenepolyamines in the amine mixture, calculated as in Example 1, is in the range from about 15.0% to about 16.5%. Thus the weight ratio of aminoethylethanolamine to polyethylenepolyamines in the amine mixture is in the range from about 1.8 to about 2.0, i.e., 46.8÷(2+6.9+16.5) to about 46.8÷(2+6.9+15). The minimum amount of acid required to insure amidation of all but one amino group per molecule of the aminoethylethanolamine and polyethylenepolyamines in the amine mixture is 9.86 milliequivalents per gram of amine mixture, i.e., (0.02) (19.4)+(0.069) (15.5)+(0.468) (9.6)+(0.003) (16.3)+(0.022) (9.6)+(0.165) (22.1).

Various amide mixtures as indicated in Table 2 were prepared from this polyamine mixture using the tall oil fatty acid of Example 1.

TABLE 2

| A Amide Mixture | Composition of Amide Mixtures | | |
|---|---|---|---|
| | B Grams of TOFA per Gram of PM | C Milliequivalents of TOFA per Gram of PM | D Column C ÷ TAV of PM |
| 2a | 2.18 | 7.53 | 0.48 |
| 2b | 2.91 | 10.03 | 0.64 |
| 2c | 3.64 | 12.54 | 0.80 |
| 2d | 4.36 | 15.05 | 0.96 |
| 2e | 5.09 | 17.55 | 1.11 |

These amide mixtures were used to prepare adducts with humic acid using the procedure of Example 1. The samples were then evaluated as in Example 1. The data obtained are given in Table 2A.

As in Example 1, Amide Mixture 2c could not be processed into a humic acid derivative as the material resulting from step 7 was too tacky to grind.

TABLE 2A

Evaluation of the Organophilic Lignite Samples Prepared from the Amide Mixtures

| Amide Mixture Used to Prepare Organophilic Lignite | API Fluid Loss, ml. | |
|---|---|---|
| | MENTOR 28 | Diesel Oil |
| 2a | 136 | 40.5 |
| 2b | 53 | 13 |
| 2c | 8 | 3.5 |
| 2d | 3 | 2 |

The data indicate that samples 2b–2d, examples of the adducts of this invention, were much better fluid loss additives than sample 2a which was prepared from an amide mixture which is not a component of this invention.

EXAMPLE 3

Mixtures of aminoethylethanolamine (AEEA) and tetraethylenepentamine (TEPA) are prepared as indicated in Table 3 and amidated with a tall oil fatty acid containing 2% rosin acids using the amount of acid indicated in Table 3. Humic acid derivatives are prepared from these amide mixtures using the following procedure:

(1) 100 grams of North Dakota Leonardite are mixed in a Waring Blendor with 25 grams of hot water until homogenous;

(2) 10 grams of a 50% by weight sodium hydroxide solution are added and mixed 5 minutes;

(3) A mixture of 35 grams of the amide mixture and 7.5 grams of glacial acetic acid are added and mixed five minutes;

(4) 2.5 grams of lime are added and mixed 2 minutes;

(5) The sample is dried to about 7.5% moisture and ground.

We claim:

1. An adduct of a polyphenolic acid selected from the group consisting of humic acid, sulfonated humic acid, and mixtures thereof, and an amide mixture of a polyamide and an amido-amine containing one free amino group per molecule, wherein the weight ratio of said amide mixture to said polyphenolic acid is in the range from about 0.2 to 1 to about 1 to 1, and wherein said amide mixture is obtained by reacting under amidation conditions an acid containing from about 16 to about 30 carbon atoms per molecule selected from the group consisting of aliphatic carboxylic fatty acids, rosin acids, and mixtures thereof, and an amine mixture comprising aminoethylethanolamine, aminoethylpiperazine, and one or more linear polyethylenepolyamines containing at least 3 amino groups per molecule, said amine mixture having a weight ratio of said aminoethylethanolamine to said aminoethylpiperazine and said linear polyethylenepolyamine within the range from about 0.25 to 1 to about 3 to 1, wherein the amount of said acid is greater than the amount required to amidate (X−1) amino groups per amine molecule where X is the average number of amino groups per molecule in said amine mixture, and less than the amount required to amidate all of the amino groups.

2. The adduct of claim 1 wherein the weight ratio in said amide mixture of said acid to said amine mixture is greater than (0.745)(TAV)(M) to 1 and less than (TAV)(M) to 1 where TAV is the number of milliequivalents of amino groups per gram of said amine mixture and M is the number of grams per milliequivalent of said acid, and wherein the weight ratio or said aminoethylethanolamine to said aminoethylpiperazine and said linear polyethylenepolyamine is within the range from about 0.75 to 1 to about 3 to 1.

3. The adduct of claim 1 wherein said weight ratio of said amide mixture to said polyphenolic acid is in the range from about 0.3 to 1 to about 0.75 to 1.

4. The adduct of claim 2 wherein said weight ratio of said amide mixture to said polyphenolic acid is in the range from about 0.3 to 1 to about 0.75 to 1.

5. The adduct of claim 1 additionally containing from about 2% to about 10%, based on the weight of said polyphenolic acid, of lime.

6. In a process for drilling a well wherein there is circulated in the well an oil base drilling fluid subject to filtration into permeable formations penetrated by the well, the method of maintaining said filtration at a selected low value during said drilling which comprises admixing with said drilling fluid the adduct of claim 1.

7. In a process for drilling a well wherein there is circulated in the well an oil base drilling fluid subject to filtration into permeable formations penetrated by the well, the method of maintaining said filtration at a selected low value during said drilling which comprises admixing with said drilling fluid the adduct of claim 2.

8. In a process for drilling a well wherein there is circulated in the well an oil base drilling fluid subject to filtration into permeable formations penetrated by the well, the method of maintaining said filtration at a selected low value during said drilling which comprises admixing with said drilling fluid the adduct of claim 3.

9. In a process for drilling a well wherein there is circulated in the well an oil base drilling fluid subject to filtration into permeable formations penetrated by the well, the method of maintaining said filtration at a selected low value during said drilling which comprises admixing with said drilling fluid the adduct of claim 4.

10. In a process for drilling a well wherein there is circulated in the well an oil base drilling fluid subject to filtration into permeable formations penetrated by the well, the method of maintaining said filtration at a selected low value during said drilling which comprises admixing with said drilling fluid the adduct of claim 5.

11. An oil base drilling fluid comprising a major proportion of oil and a minor proportion but sufficient to decrease the fluid loss of said fluid of the polyphenolic acid adduct of claim 1.

12. An oil base drilling fluid comprising a major proportion of oil and a minor proportion but sufficient to decrease the fluid loss of said fluid of the polyphenolic acid adduct of claim 2.

13. An oil base drilling fluid comprising a major proportion of oil and a minor proportion but sufficient to decrease the fluid loss of said fluid of the polyphenolic acid adduct of claim 3.

14. An oil base drilling fluid comprising a major proportion of oil and a minor proportion but sufficient to decrease the fluid loss of said fluid of the polyphenolic acid adduct of claim 4.

* * * * *